United States Patent
Kholaif et al.

(10) Patent No.: US 11,057,157 B2
(45) Date of Patent: Jul. 6, 2021

(54) TRANSMISSION FRAME COUNTER

(71) Applicant: Hewlett Packard Enterprise Development LP, Houston, TX (US)

(72) Inventors: Ahmad Kholaif, Santa Clara, CA (US); Wei Hu, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 57 days.

(21) Appl. No.: 16/023,261

(22) Filed: Jun. 29, 2018

(65) Prior Publication Data

US 2020/0007276 A1 Jan. 2, 2020

(51) Int. Cl.
*H04L 1/16* (2006.01)
*H04L 12/26* (2006.01)
*H04L 29/06* (2006.01)
*H04W 84/12* (2009.01)

(52) U.S. Cl.
CPC ........ *H04L 1/1621* (2013.01); *H04L 43/0823* (2013.01); *H04L 63/1425* (2013.01); *H04W 84/12* (2013.01)

(58) Field of Classification Search
CPC .............. H04L 1/1621; H04L 43/0823; H04L 63/1425; H04W 84/12
See application file for complete search history.

(56) References Cited

U.S. PATENT DOCUMENTS

| | | | |
|---|---|---|---|
| 6,580,697 B1 * | 6/2003 | Gardner | H04L 5/1446 370/296 |
| 6,721,316 B1 * | 4/2004 | Epps | H04L 45/60 370/360 |
| 6,859,456 B1 * | 2/2005 | Hetherington | H04L 1/1841 370/230 |
| 7,360,075 B2 * | 4/2008 | VanHeyningen | H04L 9/12 380/262 |
| 7,404,210 B2 * | 7/2008 | Lin | H04L 63/1458 370/392 |
| 7,734,978 B2 * | 6/2010 | Nakashima | H04L 1/1607 370/338 |
| 7,746,861 B2 * | 6/2010 | Nishibayashi | H04L 1/1621 370/392 |

(Continued)

OTHER PUBLICATIONS

Cisco Adaptive Wireless Intrusion Prevention System Configuration Guide, Release 7.2.103.0, Cisco, Feb. 18, 2018. 46 Pgs.

(Continued)

*Primary Examiner* — Huy D Vu
*Assistant Examiner* — Bailor C. Hsu
(74) *Attorney, Agent, or Firm* — Brooks, Cameron & Huebsch, PLLC

(57) ABSTRACT

An apparatus may comprise a processing resource operatively coupled to a memory resource and a frame determination component operatively coupled to the processing resource and the memory resource. The frame determination component may cause a counter corresponding to a particular station associated to the apparatus to be stored in the memory resource, the counter to be incremented in response to receipt of a transmission frame containing an invalid starting sequence number (SEN) and a deauthentication frame to be transmitted in response to receipt of a threshold number of transmission frames containing the invalid.

20 Claims, 4 Drawing Sheets

(56) References Cited

U.S. PATENT DOCUMENTS

| | | | | |
|---|---|---|---|---|
| 7,818,795 | B1* | 10/2010 | Arad | H04L 63/1458 726/13 |
| 7,870,602 | B2* | 1/2011 | Adams | H04L 63/0209 726/11 |
| 8,238,236 | B2* | 8/2012 | Kim | H04L 1/0001 370/230 |
| 8,473,732 | B2 | 6/2013 | Ptasinski et al. | |
| 8,627,074 | B1 | 1/2014 | Goel et al. | |
| 9,125,130 | B2* | 9/2015 | Setia | H04W 48/02 |
| 9,219,986 | B2* | 12/2015 | Pandey | H04W 4/023 |
| 9,979,640 | B2* | 5/2018 | Vasudevan | H04L 47/54 |
| 2006/0230305 | A1 | 10/2006 | Smith et al. | |
| 2007/0005985 | A1 | 1/2007 | Eldar et al. | |
| 2009/0319852 | A1* | 12/2009 | Nabetani | H04L 1/1854 714/749 |
| 2010/0299725 | A1* | 11/2010 | Yamada | H04L 1/1607 726/4 |
| 2019/0349334 | A1* | 11/2019 | Touboul | H04W 12/122 |

OTHER PUBLICATIONS

Controller Based Wlans, Nov. 11, 2014, 6 Pgs.

Moorthy et al, Effective Authentication Technique for Distributed Denial of Service Attacks in Wireless Local Area Networks, Journal of Computer Science 8, 2012, 7 Pgs.

Working with Intrusion Detection, Retrieved Jun. 13, 2018, 9 Pgs.

Extended European Search Report received for EP Application No. 19164846.8, dated Nov. 5, 2019, 9 pages.

Mohite et al., "Cooperative Security Agents for MANET", 2012 World Congress on Information and Communication Technologies, Trivandrum, 2012, pp. 549-554.

\* cited by examiner

TRANSMISSION FRAME COUNTER

BACKGROUND

Wireless networks may provide various types of communication to multiple users through the air using electromagnetic waves. As a result, various types of communication may be provided to users without cables, wires, or other physical electric conductors to couple devices in the wireless network. Examples of the various types of communication that may be provided by wireless networks include voice communication, data communication, multimedia services, etc. Wireless networks may include network devices such as access points (APs), which may communicate with each other to detect other APs and/or user devices.

DETAILED DESCRIPTION

Figure 1:
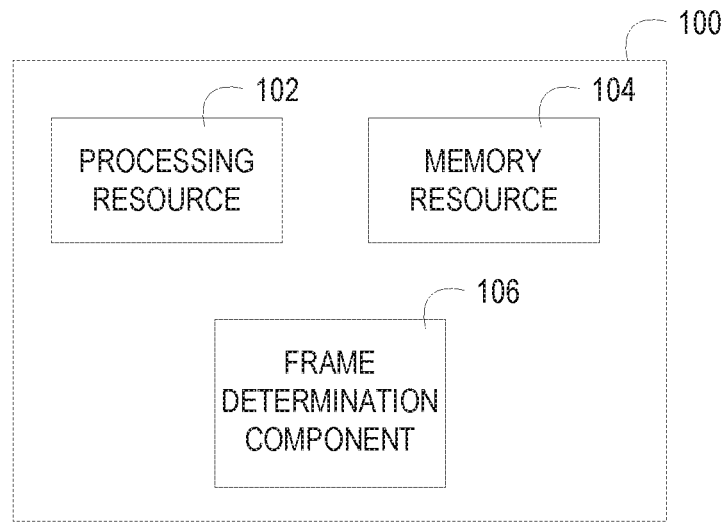
FIG. 1 illustrates a block diagram in the form of an example apparatus including a frame determination component consistent with the disclosure.

An example of a wireless network is a wireless local area network (WLAN). As used herein, the term "wireless local area network (WLAN)" can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs), controllers (e.g., WLAN controller(s)), and/or network devices such as access points (APs) that may communicate over wireless channels. An AP may be a networking hardware device that allows a wireless-compliant device (e.g., a STA) to connect to a network, while a controller may perform configuration operations and/or authentication operations on APs and/or STAs.

The STAs and/or APs may each include a radio to communicate and/or exchange information over the wireless channels. As used herein, the term "information" can, for example, refer to data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format such as packets, frames, or cells. As used herein, the term "radio" can, for example, refer to an antenna or aerial which converts electric power into electromagnetic waves and vice versa.

An AP may provide connectivity with a network such as the Internet to the STAs. As used herein, the term "AP" can, for example, refer to receiving points for any known or convenient wireless technology which is known, or which may later become known. Specifically, the term AP is not intended to be limited to Institute of Electrical and Electronics Engineers (IEEE) 802.11-based APs. APs generally function as an electronic device that is adapted to allow wireless devices to connect to a wired network via various communications standards. As used herein, the term "STA" can, for example, refer to a device that has the capability to use the Institute of Electrical and Electronics Engineers (IEEE) 802.11 protocol. Examples of STAs include smart phones, laptops, physical non-virtualized computing devices, personal digital assistants, phablets, wearables, etc. In some examples, a STA may be a device that contains an IEEE 802.11-conformant media access control (MAC) and physical layer (PHY) interface to a wireless medium (WM). As used herein, the term "controller" can, for example, refer to a WLAN controller that performs load balancing operations, authentication operations, interference detection and avoidance operations, and/or coverage hole detection and correction operations for the network.

Wireless networks such as WLANs can use various wireless communication technologies. In some examples, WLANs can use orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. For example, some wireless networks may include controllers, APs, and/or STAs that may be used to facilitate communication in the network. Such networks may allow for multiple user (MU) MIMO communication. WLANs such as those defined in the IEEE wireless communications standards (e.g., IEEE 802.11a, IEEE 802.11n, IEEE 802.11ac, etc.), can use OFDM to transmit and receive signals. Moreover, WLANs, such as those based on the IEEE 802.11n or IEEE 802.11ac or IEEE 802.11ax standards, can use OFDM/OFDMA and MIMO.

In some examples, APs and/or radios may transmit and/or receive signals to determine information associated with other APs, STAs, and/or radios that are within a particular geographic area. The particular geographic area may be referred to as a neighborhood or a radio-frequency (RF) neighborhood.

Although many of the signals received and/or transmitted between APs and STAs are utilized by the APs and STAs to facilitate communication between such devices in the RF neighborhood, some signals that are intended to disrupt communications between devices in the RF neighborhood may be transmitted and/or received by the APs and/or STAs. An example of such signals may occur in relation to a denial of service (DoS) attack, which may be performed by STAs in the RF neighborhood. A DoS attack may refer to a scenario in which a malicious actor carries out a cyber-attack by temporarily or indefinitely disrupting services of a network device connected to the WLAN (e.g., associated to an AP in the WLAN).

An example of a DoS attack that may be carried out in a WLAN may involve STAs in the WLAN transmitting block acknowledgment (ACK) frames including an invalid starting sequence number (SEN) to the AP. As used herein, a block ACK frame is a frame that can be used to acknowledge multiple media access control protocol data units (MPDUs) in a single frame. In some examples, a block ACK frame may contain a bitmap size of 64×16, where the 16 bits account for the number of MPDUs to be acknowledged. In general, the SEN of the block ACK frame indicates that data transmitted with the frame has been received to a specific byte.

By altering the SEN such that the SEN of the block ACK is invalid, a STA can, in response to data received from the AP, transmit frames to the AP indicating that the frames transmitted by the AP to the STA were not successfully received. In accordance with the IEEE 802.11 protocol, the AP may then retry transmission of the previously transmitted frames until a successful block ACK (e.g., a block ACK with a valid SEN) is transmitted by the STA or until a retry limit has been reached.

In some approaches, when the AP retries transmission of the previously transmitted frames in response to receipt of a block ACK with an invalid SEN, the PHY rate and/or modulation and coding scheme (MCS) used by the AP may be altered in an attempt to obtain a higher reception probability at the STA. For example, the MCS may be lowered on successive retry attempts, which may lead to the same frame incurring a longer channel time as opposed to a scenario in which the frame is transmitted at a higher MCS.

In such approaches, if the STA continues to transmit block ACKs with invalid SENs to the AP, the AP may continue to retry transmission of frames designated for the STA that is or has transmitted the block ACK(s) with the invalid SEN(s), which may cause the channel busy time of the AP to increase. This may reduce performance of the AP and/or throughput per channel of the AP, which may in turn give rise to resource starvation for other STAs in the RF neighborhood of the effected.

In contrast, examples described herein may provide an AP with various schemes for identifying and/or protecting against DoS attacks based on transmission of block ACK frames with invalid SENs transmitted from STAs associated to the AP. For example, as described herein, a counter (e.g., a frame failure counter) may be provided to the AP. The counter may be incremented in response to receipt of block ACK frame including invalid SENs. In some examples, the AP may transmit a deauthentication frame to the STA to disassociated the STA from the AP in response to receipt of a threshold number of block ACK frames including invalid SENs as counted by the counter.

In another example, the AP may transmit a block ACK request in response to receipt of a threshold number of block ACK frames including invalid SENs as counted by the counter. The counter may be incremented in response to receipt of a block ACK frame with a valid SEN that is received in response to the block ACK request transmission. If subsequent block ACK frames received by the AP contain invalid SENs, the counter may be further incremented and, in response to receipt of a threshold number of block ACK frames including invalid SENs, the AP may transmit a deauthentication frame to the STA to disassociate the STA from the AP. In this example, the counter is incremented in response to receipt of the block ACK including the valid SEN to combat scenarios in which the block ACK is tweaked to provide a valid SEN in order to avoid deauthentication by the AP and then subsequently altered to an invalid SEN to continue the DoS attack.

By deauthenticating a STA whose invalid SEN count has exceeded the threshold, performance of the AP may be increased in comparison to approaches in which a counter is not employed to count received transmission frames containing in valid SENs. For example, channel time used by the AP may be reduced and/or throughput of AP channels may be improved by deauthenticating a STA whose invalid SEN count has exceeded the threshold. In addition, RF resource starvation to other STAs in the RF neighborhood may be alleviated based on the increased performance of the AP.

Examples of the disclosure include apparatuses, methods, and systems for related to a transmission frame counter. In some examples, an apparatus may comprise a processing resource operatively coupled to a memory resource and a frame determination component operatively coupled to the processing resource and the memory resource. The frame determination component may cause a counter corresponding to a particular station (STA) associated to the apparatus to be stored in the memory resource, the counter to be incremented in response to receipt of a transmission frame containing an invalid starting sequence number (SEN) and a deauthentication frame to be transmitted in response to receipt of a threshold number of transmission frames containing the invalid SEN.

FIG. 1 illustrates a block diagram in the form of an example apparatus 100 including a frame determination component 106 consistent with the disclosure. As shown in FIG. 1, the apparatus 100 may include a processing resource 102, a memory resource 104, and a frame determination component 106. The processing resource 102, the memory resource 104, and/or the frame determination component 106 may be operatively coupled to one another such that information may be transmitted between them. The apparatus 100 may be a network device such as an AP, a switch, a router, or other WLAN network device. In some example, the processing resource 102, the memory resource 104, and/or the frame determination component 106 may be separately be considered an "apparatus."

The frame determination component 106 may include hardware that may execute instructions to perform certain tasks and/or functions. For example, the frame determination component 106 may cause a counter (e.g., the transmission frame failure counter 208 illustrated and discussed in connection with FIG. 2, herein) to be stored in the memory resource. Examples are not so limited, however, and the frame determination component 106 may be an integrated circuit (e.g., an application-specific integrated circuit, field programmable gate array, etc.), logic, etc. communicatively coupled to the processing resource 102 and/or the memory resource 104 that may carry out the tasks and/or functions described herein.

The frame determination component may cause the counter to be incremented in response to receipt of a transmission frame containing an invalid starting sequence number (SEN). The transmission frame containing the invalid SEN may be a block acknowledgement (ACK) frame. As described above, the apparatus 100 may comprise an AP, which may further include an antenna or an antenna array (e.g., the antenna 210 illustrated and described in connection with FIG. 2, herein). In some examples, the antenna may be used to receive the transmission frames containing the invalid SENs.

In some examples, the frame determination component 106 may cause the counter to be incremented monotonically in response to the apparatus 100 receiving a transmission frame that contains an invalid SEN. In some examples, the transmission frame containing the invalid SEN may be received to the apparatus 100 from a STA (e.g., STA 312 illustrated in FIG. 3 or STA 412 illustrated in FIG. 4, herein) associated to the apparatus 100.

The frame determination component 106 may cause a deauthentication frame to be transmitted in response to receipt of a threshold number of transmission frames containing the invalid SEN. For example, the frame determination component 106 may transmit a deauthentication frame (or cause a deauthentication frame to be transmitted) from the apparatus 100 to a STA associated to the apparatus 100 once the counter has reached the threshold number of transmission frames containing the invalid SEN. In some examples, the antenna (e.g., antenna 210) may be used to transmit the deauthentication frame from the apparatus 100 to the STA associated to the AP.

The frame determination component 106 may cause transmission frames received subsequent to transmission of the deauthentication frame to be blocked. For example, the frame determination component 106 may add identifying information corresponding to the STA that is transmitting the transmission frames containing the invalid SENs to be added to a media access control (MAC) blacklist so that the STA is unable to re-associate to the apparatus 100. The STA may be added to the MAC blacklist for a predetermined amount of time, a configurable amount of time, or may be blocked from re-associating to the apparatus 100 indefinitely.

The threshold number may be predetermined, or the threshold number may be dynamically determined based on conditions of a RF neighborhood in which the apparatus 100 is deployed. In some examples, the threshold number may be around 450, however, examples are not so limited, and the threshold number may be greater than 450 or less than 450.

The frame determination component 106 may cause a block acknowledgement (ACK) request to be transmitted in response to receipt of the threshold number of transmission frames containing the invalid SEN. For example, in response to the counter being incremented to a number greater than the threshold number in response to receipt of transmission frames containing the invalid SEN, the frame determination component 106 may transmit a block ACK request (or cause a block ACK request to be transmitted) from the apparatus 100 to a STA associated to the apparatus 100.

In some examples, the frame determination component 106 may cause the counter stored by the memory resource 104 to not be incremented in response to receipt of a transmission frame containing a valid SEN subsequent to transmission of the block ACK request. However, the frame determination component 106 may cause the counter stored by the memory resource 104 to not be reset in response to receipt of a transmission frame containing a valid SEN subsequent to transmission of the block ACK request. Examples are not so limited, however, and in some examples, the frame determination component 106 may cause the counter stored by the memory resource 104 to be incremented in response to receipt of a transmission frame containing an invalid SEN subsequent to transmission of the block ACK request.

In some examples, incrementing the counter responsive to transmission frames received in response to the block ACK request frame may allow the apparatus 100 to determine a number of attempted transmission frames versus a number of successful transmission frames, which may, in turn, reduce the possibility that a STA sending the transmission frames temporarily transmits a transmission frame with a valid SEN to trick the apparatus 100 into continuing to receive subsequent transmission frames that may include invalid SENs. Stated alternatively, by incrementing the counter in response to both transmission frames containing invalid SENs and transmission frames containing valid SENs that are sent in response to a block ACK request, the apparatus 100 may identify and prevent DoS attacks from a STA transmitting the counted transmission frames.

Figure 2:
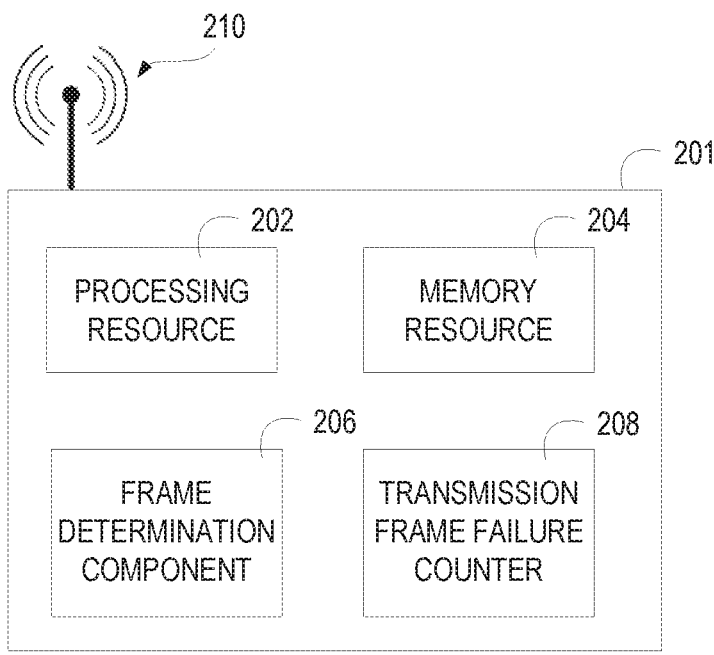
FIG. 2 illustrates a block diagram in the form of an example system including a transmission frame failure counter consistent with the disclosure.

FIG. 2 illustrates a block diagram in the form of an example system 201 including a transmission frame failure counter 208 consistent with the disclosure. As shown in FIG. 2, the system 201 may include a processing resource 202, a memory resource 204, a frame determination component 206, a transmission frame failure counter 208, and/or an antenna 210. In some examples, the system 201 may be analogous to the apparatus 100 illustrated in FIG. 1. The system 201 may be a network device such as an AP, router, network switch, etc., as described herein. The processing resource 202, the memory resource 204, the frame determination component 206, the transmission frame failure counter 208, and/or the antenna 210 may be referred to separately or in various combinations as a "system" or an "apparatus."

The frame determination component 206 may be coupled (e.g., operatively coupled) to the processing resource 202, the memory resource 204, the transmission frame failure counter 208, and/or the antenna 210. In some examples, the transmission frame failure counter 208 may be stored in the memory resource 204, however, examples are not so limited, and the transmission frame failure counter 208 may, in some examples, include memory resources separate from the memory resource 204. Although shown as a single transmission frame failure counter 208 in FIG. 2, examples are not so limited, and the transmission frame failure counter 208 may comprise a plurality of transmission frame failure counters. In such examples, each transmission frame failure counter may correspond to a different STA that is associated to the system 201.

In some examples, the antenna 210 may receive transmission frames (e.g., block ACK frames) from a STA associated to the system 201. For example, the antenna 210 may be a radio or aerial that can receive electromagnetic waves corresponding to the transmission frames and convert the electromagnetic waves into a signal that can be understood by other components of the system 201. As described above, the transmission frames may be block ACK frames that include an invalid SEN.

In some examples, the frame determination component 206 may cause a determination to be made that a transmission frame includes an invalid starting sequence number (SEN). The frame determination component 206 may cause the transmission frame failure counter 208 to be incremented in response to the determination that the transmission frame includes the invalid SEN.

The frame determination component 206 may cause a block acknowledgement (ACK) request to be transmitted in response to receipt of a threshold number of transmission frames containing the invalid SEN. For example, in response to the counter being incremented to a number greater than the threshold number in response to receipt of transmission frames containing the invalid SEN, the frame determination component 206 may transmit a block ACK request (or cause a block ACK request to be transmitted) from the system 201 to a STA associated to the system 201.

In some examples, the frame determination component 206 may cause the transmission frame failure counter 208 to not be incremented in response to receipt of a transmission frame containing a valid SEN subsequent to transmission of the block acknowledgement request, as described in more detail in connection with FIGS. 3 and 4, herein. However, the frame determination component 206 may cause the transmission frame failure counter 208 to not be reset in response to receipt of a transmission frame containing a valid SEN subsequent to transmission of the block acknowledgement request.

Subsequent to receipt of the block ACK frame received in response to transmission of the block ACK request fame, the frame determination component 206 may cause a deauthentication frame to be transmitted. The deauthentication frame may be transmitted to a STA associated to the system 201, as described above. The deauthentication frame may disassociate the STA from the system 201 such that the STA is no longer able to send transmission frames to the system 201. Examples are not so limited, however, and the system may receive additional transmission frames subsequent to receipt of the transmission frame received in response to the block ACK request frame, but prior to transmission of the deauthentication frame.

For example, the frame determination component 206 may continue to increment the transmission frame failure counter 208 responsive to receipt of transmission frames received subsequent to receipt of the transmission frame received in response to the block ACK request frame. Stated alternatively, in some examples, the transmission frame failure counter 208 may not be reset responsive to receipt of a block ACK frame containing a valid SEN in response to the block ACK request frame. As a result, in some examples, the frame determination component 206 may continue to cause the transmission frame failure counter 208 to be incremented until a threshold number of transmission frames (e.g., transmission frames containing an invalid SEN, transmission frames containing a valid SEN that are received in response to the block ACK request, and transmission frames containing an invalid SEN received subsequent to receipt of the transmission frame containing a valid SEN that are received in response to the block ACK request) has been reached prior to transmitting the deauthentication frame.

In some examples, the threshold number may be based on a number of transmission frames that include the invalid SEN and/or the valid SEN responsive to the block ACK request. For example, the threshold number may be based, at least in part, on a quantity of attempted transmission frames (e.g., transmission frames containing an invalid SEN) and a quantity of successful transmission frames (e.g., transmission frames containing a valid SEN sent in response to the block ACK request).

The frame determination component 206 may determine a source (e.g., a STA from which the transmission frames originate) of the transmission frames that include the invalid SEN and cause information corresponding to the source to be stored in a MAC blacklist stored in the memory resource 204. In some examples, once the threshold number of received transmission frames has been reached, the frame determination component 206 may block further traffic from the source of the transmission frames. The source may be blocked for a configurable or predetermined period of time, or the source may be blocked indefinitely from associating to the system 201.

Figure 3:
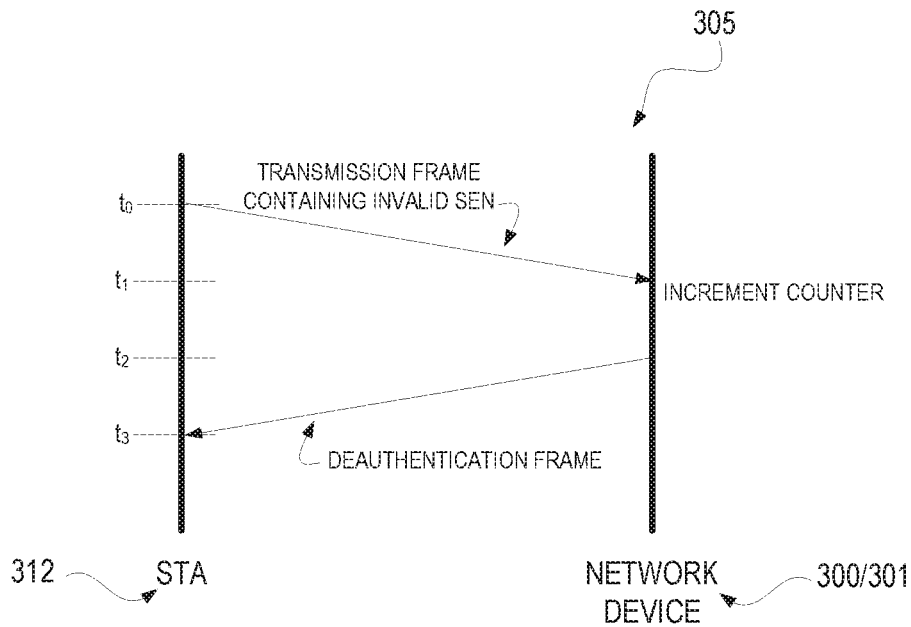
FIG. 3 illustrates an example timing diagram of frames transmitted by a station (STA) and a network device over time consistent with the disclosure.

FIG. 3 illustrates an example timing diagram 305 of frames transmitted by a station (STA) 312 and a network device 300/301 over time consistent with the disclosure. The STA 312 can be a smart phone, laptop, virtual computing instance, physical non-virtualized computing device, personal digital assistant, phablet, etc. that may be associated (e.g., connected and authenticated) to the network device 300/301. In some examples, the network device 300/301 may be analogous to the apparatus 100 illustrated in FIG. 1 and/or the system 201 illustrated in FIG. 2, herein. For example, the network device 300/301 may be an AP, switch, router, etc.

At time $t_0$, the STA 312 may transmit a transmission frame to the network device 300/301. The transmission frame may contain an invalid SEN. Upon receipt of the transmission frame containing the invalid SEN at $t_1$, the network device 300/301 may increment a counter stored thereon. In some examples, the counter may be analogous to the transmission frame failure counter 208 illustrated in FIG. 2.

After the counter is incremented, the network device 300/301 may determine whether the counter has reached a threshold number. The threshold number may correspond to a number of transmission frames containing an invalid SEN received by the network device 300/301, as described herein. If the network device 300/301 determines that the counter has not reached the threshold number of received transmission frames containing the invalid SEN, the network device 300/301 may receive a subsequent transmission frame from the STA 312. In some examples, when a STA is deauthenticated, all transmissions to and receptions from the STA are stopped.

However, if the network device 300/301 determines that the counter has been incremented to the threshold number of received transmission frames containing the invalid SEN, at time $t_2$, the network device 300/301 may transmit a deauthentication frame to the STA 312, which may be received by the STA 312 at time $t_3$. In some examples, the deauthentication frame may cause the STA 312 to be disassociated from the network device 300/301.

By disassociating the STA 312 from the network device 300/301 in response to receipt of a threshold number of transmission frames containing an invalid SEN, performance of the network device 300/301 may be improved in comparison to approaches in which the STA 312 is not disassociated from the network device 300/301 in response to receipt of a threshold number of transmission frames containing an invalid SEN. For example, channel busy time of the network device 300/301 may be reduced by disassociating the STA 312 from the network device 300/301 in response to receipt of a threshold number of transmission frames containing an invalid SEN, which may allow for a decrease in RF resource starvation in comparison to approaches in which the STA 312 is not disassociated from the network device 300/301 in response to receipt of a threshold number of transmission frames containing an invalid SEN.

Figure 4:
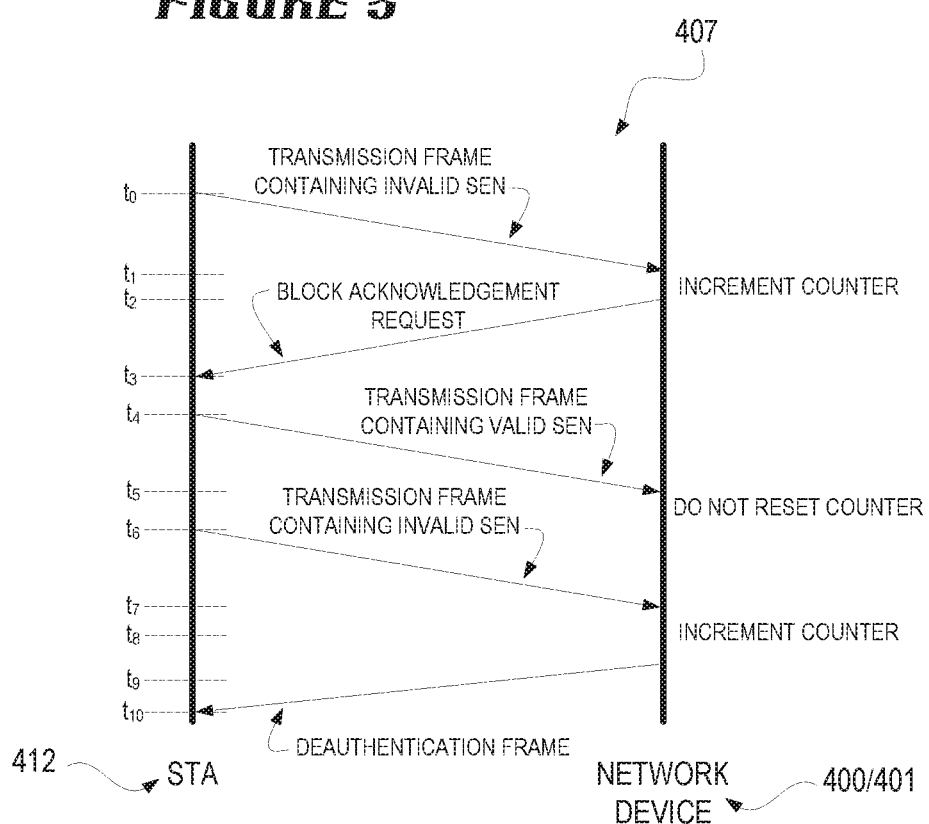
FIG. 4 illustrates another example timing diagram of frames transmitted by a station (STA) and a network device over time consistent with the disclosure.

FIG. 4 illustrates another example timing diagram 407 of frames transmitted by a station (STA) 412 and a network device 400/401 over time consistent with the disclosure. The STA 412 can be a smart phone, laptop, virtual computing instance, physical non-virtualized computing device, personal digital assistant, phablet, etc. that may be associated (e.g., connected and authenticated) to the network device 400/401. In some examples, the network device 400/401 may be analogous to the apparatus 100 illustrated in FIG. 1 and/or the system 201 illustrated in FIG. 2, herein. For example, the network device 400/401 may be an AP.

At time to, the STA 412 may transmit a transmission frame to the network device 400/401. The transmission frame may contain an invalid SEN. Upon receipt of the transmission frame at $t_1$, the network device 400/401 may increment a counter stored thereon. In some examples, the counter may be analogous to the transmission frame failure counter 208 illustrated in FIG. 2.

After the counter is incremented, the network device 400/401 may determine whether the counter has reached a threshold number. The threshold number may correspond to a number of transmission frames containing an invalid SEN received by the network device 400/401, as described herein. If the network device 400/401 determines that the counter has not reached the threshold number of received transmission frames containing the invalid SEN, the network device 400/401 may receive a subsequent transmission frame from the STA 412. In some examples, the counter may be further incremented responsive to receipt of the subsequent transmission frame containing the invalid SEN.

As described above, the transmission frames containing the invalid SEN may received by the network device 400/401 in response to frames transmitted by the network device 400/401 to the STA 412. For example, when the STA 412 is associated to the network device 400/401, the STA transmits frames to and receives frames from the network device 400/401. By transmitting frames that contain an invalid SEN to the network device 400/401, the STA 412 may attempt to carry out a DoS attack on the network device 400/401 by indicating to the network device 400/401 that the STA 412 has not received frames successfully from the network device 400/401. This may, in turn, cause the network device 400/401 to continue to transmit frames to (and receive frames from) the STA 412, which may negatively impact performance of the network device 400/401.

However, if the network device 400/401 determines that the counter has been incremented to the threshold number of received transmission frames containing the invalid SEN, at time $t_2$, the network device 400/401 may transmit a block acknowledgement (ACK) request frame to the STA 412. The block ACK request frame may be received by the STA 412 at time $t_3$.

In response to receipt of the block ACK request frame, the STA 412 may, at time $t_4$, transmit a transmission frame to the network device 400/401, which may be received by the network device 400/401 at time $t_5$. In some examples, the transmission frame transmitted by the STA 412 in response to receipt of the block ACK request frame may contain a valid SEN. For example, the STA 412 may tweak the SEN such that the SEN is valid to trick the network device 400/401 into thinking the STA 412 is functioning normally and is not being used to carry out a DoS attack on the network device 400/401. However, in order to counter scenarios in which the STA 412 transmits a transmission frame containing a valid SEN in response to the block ACK request from the network device 400/401, the network device 400/401 may not reset the counter subsequent to receipt of the transmission frame containing the valid SEN at time $t_5$. For example, by not resetting the counter in response to receipt of the transmission frame containing the valid SEN, the network device 400/401 may monitor transmission from the STA 412 over time to determine whether or not to deauthenticate the STA 412. Examples are not so limited, however, and in some examples, the network device 400/401 may increment the counter subsequent to receipt of the transmission frame containing the valid SEN at time $t_5$.

After the counter is incremented, the network device 400/401 may determine whether the counter has reached a threshold number. If the network device 400/401 determines that the counter has not reached the threshold number of received transmission frames containing the invalid SEN, the STA 412 may transmit another transmission frame containing an invalid SEN at time $t_7$. The transmission frame containing the invalid SEN that is transmitted from the STA 412 at time $t_7$ may be received by the network device 400/401 at time $t_8$.

At time $t_8$, the network device 400/401 may increment the counter in response to receipt of the transmission frame containing the invalid SEN that was transmitted by the STA 412 at time $t_6$. If the network device 400/401 determines that the counter has been incremented to the threshold number of received transmission frames, at time $t_9$, the network device 400/401 may transmit a deauthentication frame to the STA 412, which may be received by the STA 412. In some examples, the deauthentication frame may cause the STA 412 to be disassociated from the network device 400/401 at time $t_{10}$.

By disassociating the STA 412 from the network device 400/401 in response to receipt of a threshold number of transmission frames, performance of the network device 400/401 may be improved in comparison to approaches that do not utilize a counter to keep track of the number of frames with valid and invalid SENs received by the network device 400/401. For example, channel busy time of the network device 400/401 may be reduced by disassociating the STA 412 from the network device 400/401 in response to receipt of a threshold number of transmission frames, which may allow for a decrease in RF resource starvation in comparison to approaches in which the STA 412 is not disassociated from the network device 400/401 in response to the counter being incremented to a threshold value.

In some examples, the threshold number of frames detected by the counter may be based on a number of unsuccessful transmission frames (e.g., transmission frames containing an invalid SEN) and a number of successful transmission frames (e.g., transmission frames containing a valid SEN in response to the block ACK request). This may allow for the network device 400/401 to more accurately distinguish between a STA 412 that is attempting to carry out a DoS attack versus a STA that is not, thereby reducing the risk of disassociating STAs from the network device 400/401 that should not be disassociated therefrom.

Figure 5:
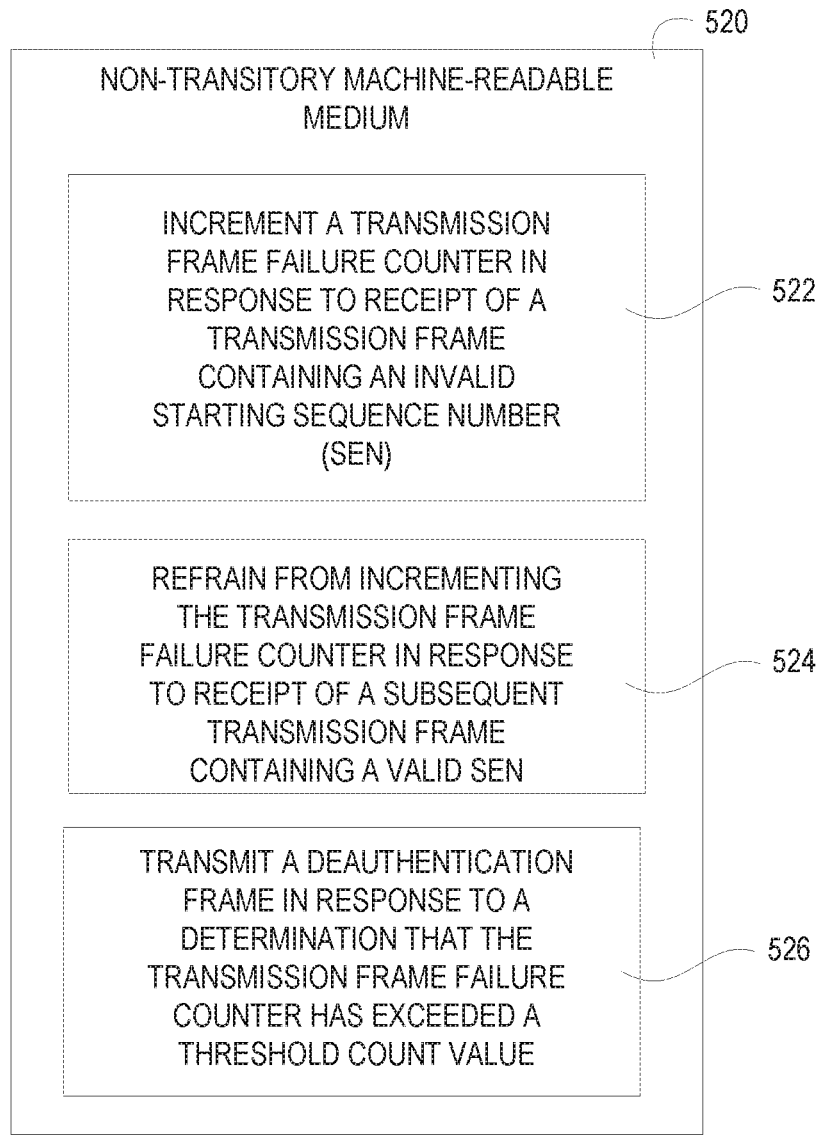
FIG. 5 illustrates an example machine-readable medium for a transmission frame counter consistent with the disclosure.

FIG. 5 illustrates an example machine-readable medium 520 for a transmission frame counter consistent with the disclosure. A processing resource (e.g., processing resource 102 illustrated in FIG. 1 or processing resource 202 illustrated in FIG. 2, herein) such as a hardware computer processor may execute instructions stored on the non-transitory machine readable medium 520. The non-transitory machine readable medium 520 may be any type of volatile or non-volatile memory or storage, such as random-access memory (RAM), flash memory, read-only memory (ROM), storage volumes, a hard disk, or a combination thereof.

The example medium 520 may store instructions 522 executable by the processing resource to increment a transmission frame failure counter in response to receipt of a transmission frame containing an invalid starting sequence number (SEN). In some examples, the transmission frame failure counter corresponds to a particular station (STA) transmitting the transmission frame. For example, transmission frames may be received from a plurality of STAs associated to a network device on which the example medium is executed and the instructions may be executable to increment a plurality of transmission frame failure counters each corresponding to a particular STA associated to the network device. The transmission frame failure counter may be analogous to transmission frame failure counter 208 illustrated in FIG. 2, herein.

The example medium 520 may further store instructions 524 executable by the processing resource to refrain from incrementing the transmission frame failure counter in response to receipt of a subsequent transmission frame containing a valid SEN. In some examples, the subsequent transmission frame containing the valid SEN may be transmitted by a STA in response to receipt of a block ACK request frame transmitted by a network device such as network device 300/301 illustrated in FIG. 3 or network device 400/401 illustrated in FIG. 4, herein.

The example medium 520 may further store instructions 526 executable by the processing resource to transmit a deauthentication frame to the particular STA in response to a determination that the transmission frame failure counter has exceeded a threshold count value. The threshold count value may, in some examples, be based on a number of successful transmission frames (e.g., transmission frames containing a valid SEN) compared to a number of unsuccessful transmission frames (e.g., transmission frames containing a valid SEN).

As described above, the deauthentication frame may disassociate a STA that receives the deauthentication frame from a network device such as an AP. In some examples, the example medium 520 may store instructions executable by the processing resource to determine a source of the transmission frame containing the invalid SEN and block subsequent transmission frames from the source for a configurable period of time.

In some examples, the example medium 520 may store instructions executable by the processing resource to transmit a block acknowledgment request in response to a determination that the network device has received a threshold number of transmission frames containing the invalid SEN and/or increment the transmission frame failure counter in response to a determination that the network device has received a transmission frame containing a valid SEN subsequent to transmission of the block acknowledgment request.

In some examples, the example medium 520 may store instructions executable by the processing resource to transmit a block acknowledgment request in response to a determination that the transmission frame failure counter has received a threshold number of transmission frames containing the invalid SEN and/or increment the transmission frame failure counter in response to a determination that the network device has received a transmission frame containing an invalid SEN subsequent to transmission of the block acknowledgment request. The example medium 520 may store instructions executable by the processing resource to transmit a block acknowledgment request subsequent to receipt of one or more block ACK frames containing an invalid SEN responsive to transmission of data frames from the network device. For example, the network device may retry transmission of negatively ACKed transmission frames prior to transmission of the block ACK request.

The example medium 520 may further store instruction executable by the processing resource to cause the system to determine the threshold number of transmission frames containing the invalid SEN based, at least in part, on a quantity of attempted transmission frames and a quantity of successful transmission frames, as described in more detail herein.

Figure 6:
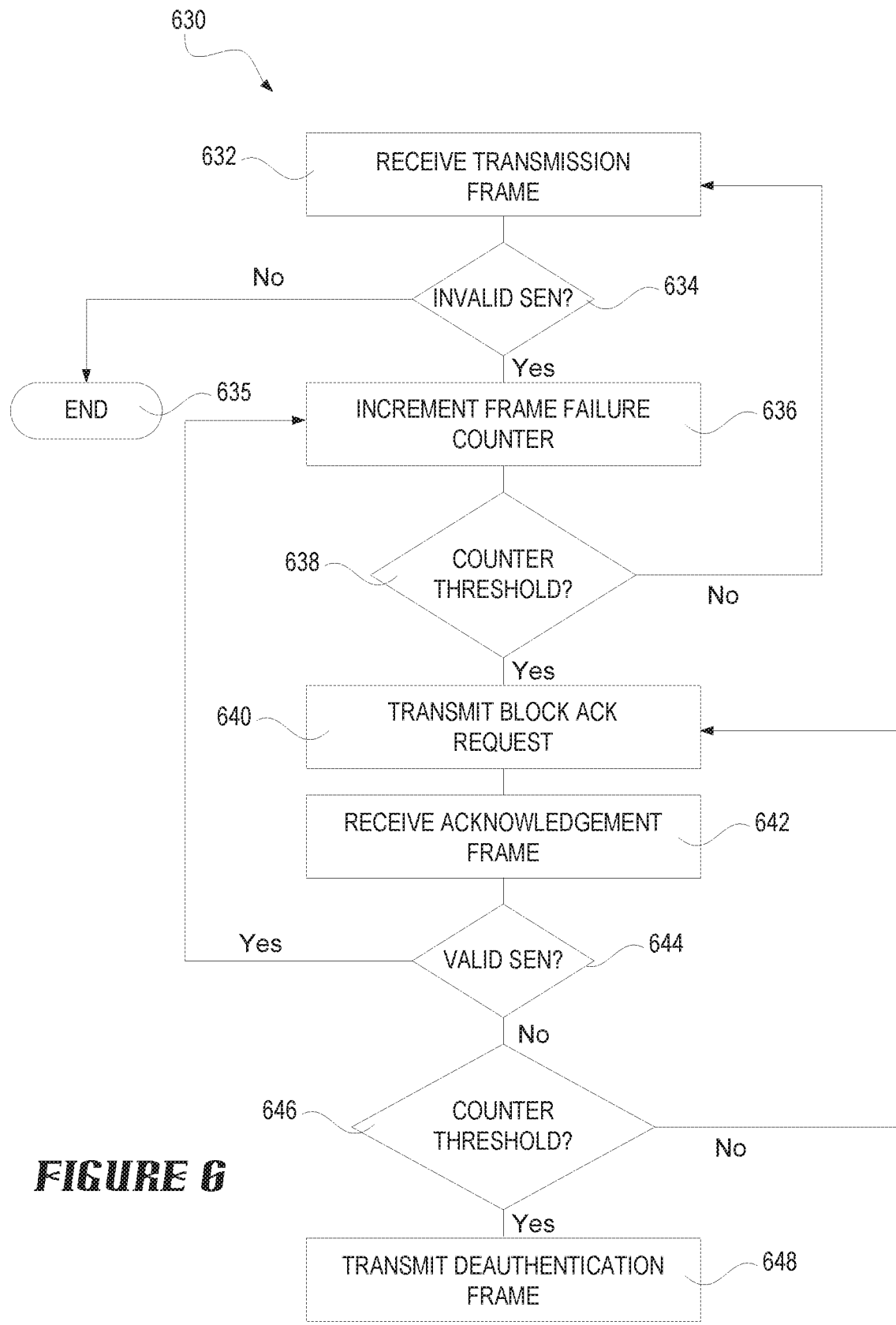
FIG. 6 illustrates an example flow diagram for a transmission frame counter consistent with the disclosure.

FIG. 6 illustrates an example flow diagram 630 for a transmission frame counter consistent with the disclosure. At block 632, a transmission frame may be received. The transmission frame may be received to a network device (e.g., the NETWORK DEVICE 300/301, or the NETWORK DEVICE 400/401 described in connection with FIGS. 3 and 4, which may be analogous to the apparatus 100 illustrated in FIG. 1 and/or the system 201 illustrated in FIG. 2, herein).

At block 634, a determination may be made as to whether the transmission frame contains an invalid starting sequence number (SEN). In some examples, the determination may be made by a frame determination component such as the frame determination component 106 illustrated in FIG. 1 or the frame determination component 206 illustrated in FIG. 2, as described herein. If the transmission frame does not contain an invalid SEN, at block 635 the process may end. If the transmission frame contains an invalid SEN, at block 636 a transmission frame failure counter (e.g., transmission frame failure counter 208 illustrated and described in connection with FIG. 2) may be incremented.

In some examples, the transmission frame failure counter may have a plurality of counter thresholds corresponding thereto. For example, the transmission frame failure counter may have a first threshold corresponding to a number of transmission frames including an invalid SEN received thereby. In addition, the transmission frame failure counter may have a second threshold corresponding to a number of transmission frames received in response to transmission of a block ACK request, as described in more detail in connection with block 646 herein. Examples are not limited to a first and second threshold, however, and the transmission frame failure counter may have any number of threshold values.

At block 638, if the transmission failure counter threshold has not been exceeded, another transmission frame may be received, as shown at block 632. If the transmission failure counter has been exceeded, at block 640, a block acknowledgment (ACK) request may be transmitted. Responsive to transmission of the block ACK request, at block 642, an ACK frame may be received.

At block 644, a determination may be made as to whether the ACK frame received in response to the block ACK request contains a valid SEN. If the ACK frame received in response to the block ACK request frame contains a valid SEN, the frame failure counter may be incremented as shown at block 636. If the ACK frame received in response to the block ACK request frame contains an invalid SEN, a determination as to whether the transmission failure counter threshold has been reached may be made at block 646.

If the transmission failure counter threshold has not been reached, a subsequent transmission frame may be received, as shown at block 632. If the transmission failure counter threshold has been reached, in some examples, a deauthentication frame may be transmitted to disassociate the source of the transmission frames.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things. Multiple like elements may be referenced herein by their reference numeral without a specific identifier at the end.

The figures herein follow a numbering convention in which the first digit corresponds to the drawing figure

What is claimed:

1. An apparatus, comprising:
a processing resource operatively coupled to a memory resource;
a frame determination component operatively coupled to the processing resource and the memory resource, wherein the frame determination component is to cause:
a counter corresponding to a particular station (STA) associated to the apparatus to be stored in the memory resource, the counter to be incremented in response to receiving a transmission frame from the particular STA, wherein the transmission frame contains an invalid starting sequence number (SEN);
a block acknowledgement request comprising a negative acknowledgment (ACK) to be transmitted to the particular STA in response to the counter reaching a value which indicates a first threshold number of transmission frames have been received from the particular STA, wherein the first threshold number of transmission frames contain the invalid SEN, and wherein the counter value is compared to a plurality of counter thresholds including the first threshold number and a second threshold number;
the processing resource to refrain from resetting the counter in response to receiving a second transmission frame from the particular STA, wherein the second transmission frame contains a valid SEN transmitted in response the block acknowledgement request; and
a deauthentication frame to be transmitted to the particular STA when the counter reaches a value which indicates receiving the second threshold number of transmission frames containing the invalid SEN, from the particular STA.

2. The apparatus of claim 1, wherein the first threshold number is determined dynamically based at least in part on one or more radio frequency (RF) conditions.

3. The apparatus of claim 2, wherein the particular STA is deauthenticated for a predetermined period of time.

4. The apparatus of claim 1, wherein the frame determination component is to cause the counter stored by the memory resource to be incremented in response to receipt of the transmission frame containing the invalid SEN subsequent to transmission of the block acknowledgement request.

5. The apparatus of claim 1, wherein the apparatus comprises an access point (AP) and wherein the AP further comprises an antenna to:
receive the transmission frame containing the invalid SEN; and
transmit the deauthentication frame.

6. The apparatus of claim 1, wherein the frame determination component is to cause transmission frames received subsequent to transmission of the deauthentication frame to be blocked.

7. The apparatus of claim 1, wherein the second threshold number of transmission frames containing the invalid SEN is based, at least in part, on a quantity of attempted transmission frames and a quantity of successful transmission frames.

8. The apparatus of claim 1, wherein the transmission frame containing the invalid SEN comprises a block acknowledgement frame.

9. A system, comprising:
an antenna to receive a plurality of transmission frames corresponding to a particular station (STA) among a plurality of STAs associated to the system;
a frame determination component operatively coupled to a processing resource and a memory resource, wherein the frame determination component is to maintain a plurality of transmission frame failure counters, wherein each transmission frame failure counter of the plurality of transmission frame failure counters correspond to a respective STA among the plurality of STAs, and wherein the frame determination component is to cause:
a determination to be made that a transmission frame from a first STA among the plurality of STAs includes an invalid starting sequence number (SEN);
a first transmission frame failure counter corresponding to the first STA among the plurality of STAs stored by the memory resource to be incremented in response to the determination that the transmission frame includes the invalid SEN;
a block acknowledgement request to be transmitted in response to the first transmission frame failure counter reaching a value which indicates a first threshold number of transmission frames have been received from the first station (STA), wherein the first threshold number of transmission frames contain the invalid SEN, and wherein the counter value is compared to a plurality of counter thresholds including the first threshold number and a second threshold number;
the transmission frame failure counter to not be incremented in response to receiving a second transmission frame from the first station (STA), wherein the second transmission frame contains a valid SEN subsequent to transmission of the block acknowledgement request; and
a deauthentication frame to be transmitted to the particular STA when the counter reaches a value which indicates the second threshold number of transmission frames containing the invalid SEN have been received from the particular STA.

10. The system of claim 9, wherein the first threshold number is determined dynamically based at least in part on one or more radio frequency (RF) conditions.

11. The system of claim 9, wherein the particular STA is deauthenticated for a predetermined period of time.

12. The system of claim 9, wherein the frame determination component is to cause the transmission frame failure counter to be incremented in response to receiving the second threshold number of transmission frames containing the invalid SEN subsequent to transmission of the block acknowledgement request.

13. The system of claim 9, wherein the second threshold number of transmission frames that include the invalid SEN is based, at least in part, on a quantity of attempted transmission frames and a quantity of successful transmission frames.

14. The system of claim 13, wherein the frame determination component is to cause transmission frames that include the invalid SEN to be blocked based, at least in part, on the quantity of attempted transmission frames and the quantity of successful transmission frames.

15. The system of claim 9, wherein the frame determination component is to:
    determine a source of the transmission frames that include the invalid SEN; and
    store identification information corresponding to the source in a media access control blacklist stored in the memory resource.

16. A non-transitory, machine-readable medium storing instructions executable by a processing resource of a system to cause the system to:
    increment a transmission frame failure counter in response to receiving a transmission frame from a particular station (STA), wherein the transmission frame contains an invalid starting sequence number (SEN), wherein the transmission frame failure counter corresponds to the particular STA transmitting the transmission frame;
    transmit, to the particular STA, a block acknowledgment request comprising a negative acknowledgment (ACK) in response to the transmission frame failure counter reaching a second threshold number of transmission frames containing the invalid SEN, and wherein the transmission frame failure counter value is compared to a plurality of counter thresholds including the second threshold number and a first threshold number;
    increment the transmission frame failure counter in response to receiving from the particular STA, a subsequent transmission frame containing a valid SEN transmitted in response the block acknowledgement request; and
    transmit a deauthentication frame to the particular STA in response to a determination that the transmission frame failure counter has exceeded the first threshold number.

17. The medium of claim 16, wherein the instructions are further executable by the processing resource to cause the system to:
    after determining that the apparatus has received a second transmission frame containing the valid SEN, refrain from incrementing the transmission frame failure counter for the second transmission frame based on the block acknowledgment request.

18. The medium of claim 16, wherein the instructions are further executable by the processing resource to cause the system to:
    transmit a second block acknowledgment request in response to a determination that the transmission frame failure counter has received the second threshold number of transmission frames containing the invalid SEN; and
    increment the transmission frame failure counter in response to a determination that the transmission frame counter has received a transmission frame containing an invalid SEN subsequent to transmission of the block acknowledgment request.

19. The medium of claim 16, wherein the instructions are further executable by the processing resource to cause the system to determine the second threshold number of transmission frames containing the invalid SEN based, at least in part, on a quantity of attempted transmission frames and a quantity of successful transmission frames.

20. The medium of claim 16, wherein the instructions are further executable by the processing resource to cause the system to block subsequent transmission frames from the particular STA for a configurable period of time subsequent to transmission of the deauthentication frame to the particular STA.

* * * * *